H. F. LIVERMORE.
LOOM TEMPLE.
APPLICATION FILED AUG. 20, 1917.

1,268,737.

Patented June 4, 1918.

Witness
Lorenzo Alberts

Inventor
Homer F. Livermore
by his attorneys
Van Everen Fish & Hildreth

UNITED STATES PATENT OFFICE.

HOMER F. LIVERMORE, OF BROOKLINE, MASSACHUSETTS.

LOOM-TEMPLE.

1,268,737.   Specification of Letters Patent.   Patented June 4, 1918.

Application filed August 20, 1917. Serial No. 187,102.

*To all whom it may concern:*

Be it known that I, HOMER F. LIVERMORE, a citizen of the United States, residing at Brookline, in the county of Norfolk and State of Massachusetts, have invented certain new and useful Improvements in Loom-Temples; and I do hereby declare the following to be a full, clear, and exact description of the invention, such as will enable others skilled in the art to which it appertains to make and use the same.

The present invention relates to an improvement in loom temples, and more particularly the invention relates to an improvement in the construction of loom temple heads.

The object of the invention is to produce an improved construction of loom temple head such that it may be cheaply manufactured, will be durable and efficient in operation and be capable of adjustment to any desired angular relation with respect to the temple bar upon which it is mounted. To the accomplishment of this object, the invention consists in the improved loom temple hereinafter described and particularly pointed out in the appended claims.

Figure 1:
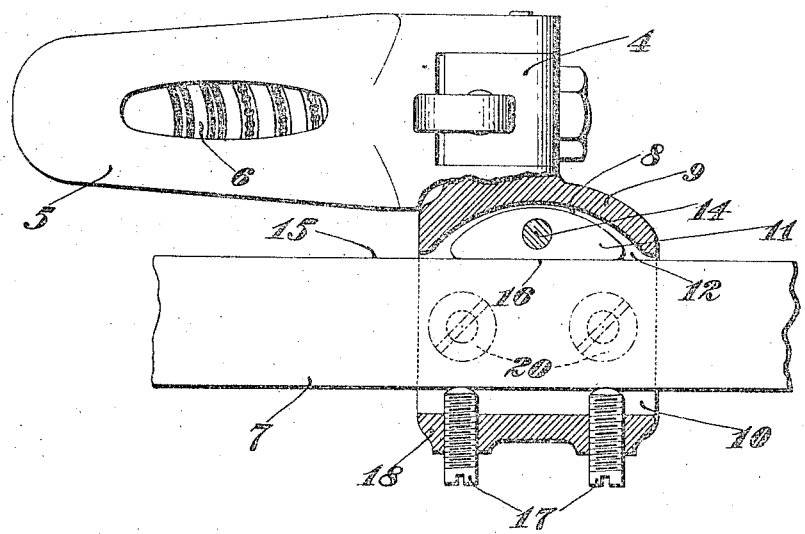
Figure 2:
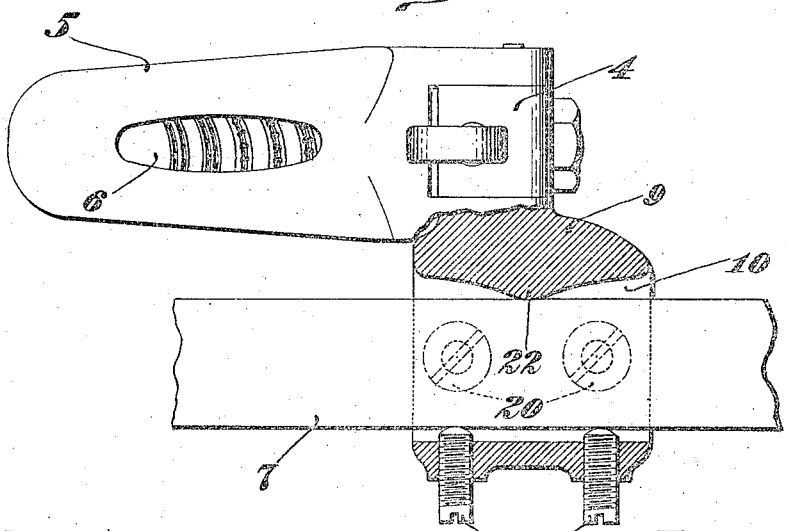

The preferred form in which it is contemplated embodying the invention is illustrated in the accompanying drawings, in which Figure 1 is a plan, partly in section, of the improved loom temple; and Fig. 2 is a plan, partly in section, similar to Fig. 1, showing a modified form of the invention.

The improved loom temple illustrated in the drawings comprises a temple head 4, which in general outline and construction may be of any usual or preferred form. Rotatable on the temple head and covered by the cap 5 is the usual temple roll 6 for engaging the woven cloth and keeping it under the requisite tension. The temple head 4 is supported in operative position by a temple bar 7, which is arranged longitudinally of the breast beam of the loom and is yieldingly pressed toward the lay in well-known manner, as shown in the patent to C. F. Thompson, No. 752,606, so that the temple head may give forward slightly on each beat-up of the lay as the reed beats the filling or weft against the fell. The temple head 4 is provided with a neck 9, through which is formed an opening 10 adapted to receive the temple bar 7, said opening 10 being substantially parallel with the axis of the temple roll so that the latter may be held transversely of the warp threads. In order that the temple head may be adjusted upon the temple bar 7 so as to bring the temple roll into any desired angular relation with the warp threads, a semi-circular adjustment shoe or gib 11 (referring to Fig. 1) is provided, located within a recess 12 extending laterally toward the temple roll from the opening 10. This adjustment shoe or gib 11 is fulcrumed upon a fixed pivot pin 14 passed vertically through the top and bottom sides of the temple neck 9. The edge 15 of the temple bar 7 is adapted to engage the straight side 16 of the adjustment shoe and is pressed thereagainst by two setscrews 17 threaded into the side 18 of the temple neck 9. It will be noted that a space 8 separates the semi-circular side of the adjustment shoe from the adjacent correspondingly shaped side of the opening 10. This is to afford the adjustment shoe such freedom of movement that the temple head may be adjusted to the desired angular relation with respect to the temple bar. The above described construction is such that when one of the setscrews is loosened and the other is tightened, the angular relation of the temple roll with respect to the temple bar, and so also its angular relation with respect to the warp threads, is changed. This construction also permits the longitudinal adjustment of the temple head on the temple bar so as to accommodate the temple head to different widths of cloth. In addition to the setscrews 17, two additional setscrews 20 (shown in the drawings in dot and dash lines) are provided to secure the temple head in adjusted position. These screws 20 are threaded into the top side (not shown in the drawings) of the temple neck and take against the flat upper side of the temple bar.

The essential feature of the above-described construction by which the angular adjustment of the temple head is effected, lies in having the temple head fulcrumed on a fixed pivot point which is located substantially half way of the opening 10 through the temple neck 9. In embodying this idea of a fixed pivot point for the temple head to fulcrum upon, it will be recognized that it may be embodied otherwise than as shown in Fig. 1. For example, it may be embodied in the modified form illustrated in Fig. 2, which shows a pivot point 22 projecting laterally into the opening 10.

This pivot point 22 lies substantially half way between the opposite ends of the opening 10, and is adapted to be engaged by the temple bar 7, which is forced against the pivot point by the setscrews 24. The construction of the modified form of the invention shown in Fig. 2 is such that when one of the setscrews 24 is loosened and the other is tightened, the angular relation of the temple head with respect to the temple bar, and so also with respect to the warp threads, will be changed in the same manner as when one of the set screws 17 in the form of the invention shown in Fig. 1 is loosened and the other is tightened.

Having thus described the invention, what I claim is:

1. A loom temple having, in combination, a temple bar, a temple head having a neck provided with an opening to receive the temple bar, a fixed pivot point in the temple neck substantially half way between the ends of the opening, and means for rocking said temple head about the fixed pivot point to change its angular relation to the temple bar.

2. A loom temple having, in combination, a temple bar, a temple head having a neck provided with an opening to receive the temple bar, a fixed pivot point in the temple neck located substantially half way between the ends of the opening and projecting into the opening in position to be engaged by one edge of the temple bar, and means for engaging the opposite edge of the temple bar whereby the temple head may be fulcrumed on the pivot point.

HOMER F. LIVERMORE.